March 24, 1959 L. MARTIRE, JR 2,878,932
FOOD TRAY
Filed April 11, 1957
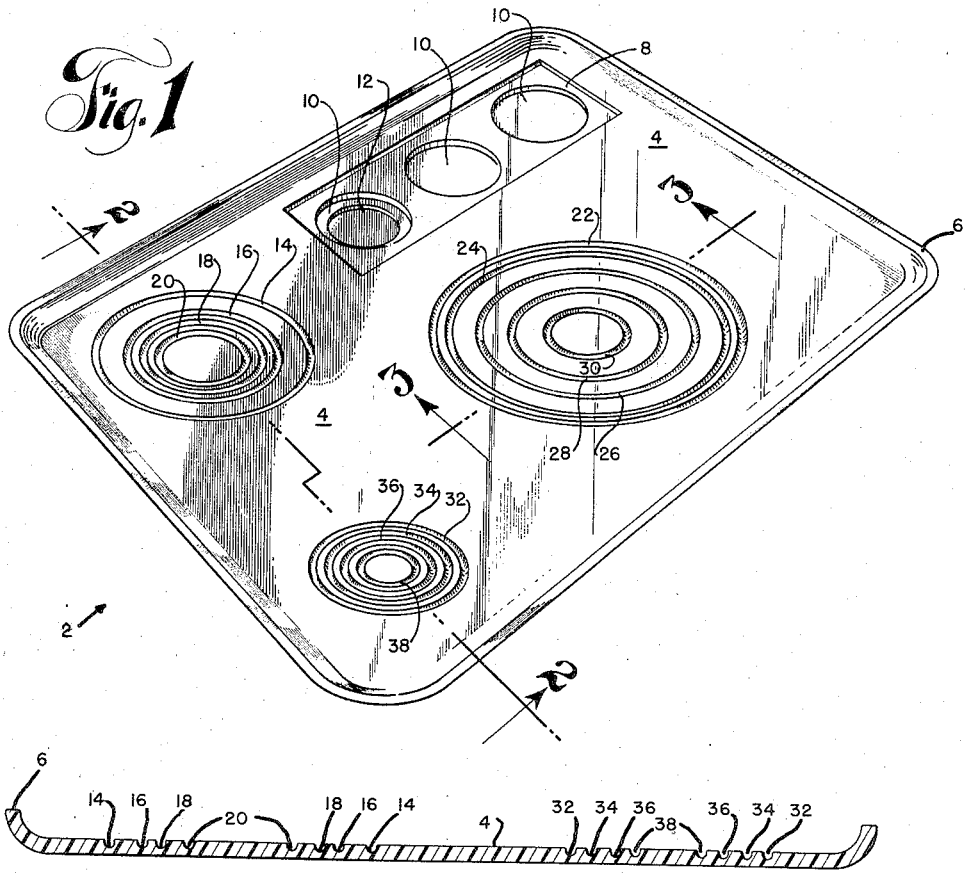
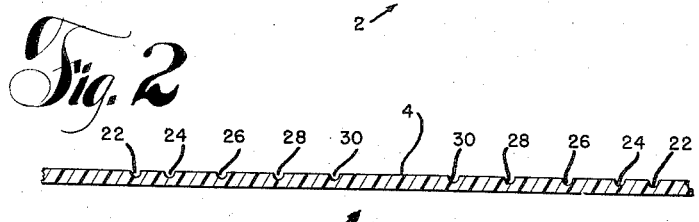
INVENTOR.
LOUIS MARTIRE JR.
BY Stanley J Price
HIS ATTORNEY

United States Patent Office 2,878,932
Patented Mar. 24, 1959

2,878,932

FOOD TRAY

Louis Martire, Jr., Pittsburgh, Pa.

Application April 11, 1957, Serial No. 652,141

2 Claims. (Cl. 206—72)

This invention relates to a food tray and more particularly to an improved food serving tray having food receptacle receiving portions.

Food serving trays are principally employed to carry food and beverages contained in receptacles, such as plates, bowls, cups and glasses, from the food preparation center to the dining table. In some instances, for example, hospitals and drive-in restaurants, the trays serve as part of the dining table. Food serving trays are also used extensively to carry the used receptacles back to the food preparation center. Thus the food serving tray is an integral and necessary part of the equipment required to provide service in eating establishments.

In using the conventional food serving trays, the present practice is to haphazardly position the food receptacles on the tray and attempt, while carrying the tray, to maintain it in a perfectly horizontal position and balance the food receptacles thereon. Any slight deviation from this horizontal position causes the surface of the tray to become an inclined surface. This inclination results in all of the receptacles sliding down the inclined surface toward the lower portion. Simultaneously the center of gravity of the tray changes due to the sliding of the receptacles so that the inclination tendency of the tray is aggravated until the tray is completely unbalanced and tips over with the resultant loss of food and breakage of the receptacles.

The above defect may be attributed in part to the relatively low frictional resistance between the food receptacles and the surface of the tray. The conventional tray has a smooth, highly polished upper surface; and the receptacles are fabricated from hard, smooth material such as glass, china or plastic. In addition the under side of the food carrying receptacles have a depending annular portion which, in effect, reduces the surface area of the receptacle that is in frictional contact with the upper surface of the tray. If either the upper surface of the tray or the bottom of the receptacle are wet, the frictional resistance between the two is for all practical purposes nil, so that there is little frictional resistance to prevent the receptacle from sliding on the tray. In fact, any abrupt movement of the tray, even in a horizontal plane, is usually sufficient to cause the receptacles to slide thereon.

Several attempts have been made to minimize or eliminate the sliding of the food receptacles on the tray surface. One such attempt was to provide the upper surface of the tray with upstanding ridge portions that restricted movement of the receptacles. These ridge portions limited the use of the tray to a particular type of receptacle at a given position on the tray and required that all receptacles be positioned on the tray to provide a balanced tray. Thus the raised ridge portions eliminate the flexibility of the tray and can only be used satisfactorily in limited applications.

Another attempt to circumvent the above described difficulty was to either fabricate the entire tray from a porous material having a high coefficient of friction or bonding a porous material to the upper surface of the tray so that the receptacles would not slide as readily thereon. Fabrication of trays in this manner result in expensive trays that are difficult to maintain in a sterile condition. Spilled food particles adhere to the porous material and are difficult and at times impossible to remove.

With my invention it is now possible to use smooth, easily cleaned material to fabricate the tray and yet limit the sliding of the receptacles thereon. In addition, as will herein be described, my tray retains its flexibility so that it can be used as a standard conventional tray and the user is not rigidly limited in the relative position of the receptacles on the tray.

Accordingly, the principal object of my invention is to provide an improved serving tray having receptacle receiving portions thereon.

Another object of my invention is to provide a food serving tray having a substantially planar upper surface with a plurality of receptacle receiving annular grooves therein.

Still another object of my invention is to provide a food serving tray having a plurality of concentric annular grooves adapted to receive the depending annular portion of food receptacles.

These and other objects and advantages of this invention will be more completely disclosed and described in the following specification, the accompanying drawings, and the appended claims.

In the accompanying drawings to be taken as part of the specification there is clearly and fully illustrated a preferred embodiment of this invention in which drawings:

Figure 1 is a perspective plan view of my improved food serving tray.

Figure 2 is a view in section taken along the line 2—2 of Figure 1 illustrating in elevation the concentric annular grooves.

Figure 3 is a view in section taken along the line 3—3 in Figure 1 illustrating in elevation other annular grooves.

Referring to the drawings and particularly Figure 1, there is illustrated my improved food serving tray generally designated by the numeral 2. The tray 2 has an upper substantially planar surface 4 and an upturned peripheral edge portion 6. Although the sectional views indicate the tray 2 is fabricated of a plastic material, it should be understood that the tray may be fabricated from any suitable material such as metal or the like.

The upper tray surface 4 has a rectangular depression 8 therein adjacent the upper right hand edge as viewed in Figure 1. Three circular depressions 10 of substantially the same depth and diameter are formed in the rectangular depression 8 and are adapted to receive the bottoms of tall glasses such as glasses used in serving iced drinks. One of the depressions 10 has an additional concentric circular depression 12 therein which extends below the surface of the respective depression 10. The circular depression 12 is adapted to receive a glass having a smaller diameter such as a juice glass or the like.

Adjacent the upper left hand edge of the tray as viewed in Figure 1 there is a group of concentric annular grooves, designated respectively according to decreasing diametrical dimension by the numerals 14, 16, 18 and 20. The annular groove 14 is adapted to receive the depending ring portion of a small sized plate. The annular groove 16 is adapted to receive the depending ring portion of a soup or salad bowl. The annular groove 18 is adapted to receive the depending ring portion of a vegetable dish or the like and the inner annular groove 20 is adapted to receive the depending ring portion of a coffee cup.

Adjacent the lower right hand edge of the tray 2 as viewed in Figure 1, in spaced relation to the rectangular depression 8, there is another group of concentric annular grooves in the tray upper surface 4 designated respectively according to decreasing diametrical dimension by the numerals 22, 24, 26, 28 and 30. The annular grooves in this group are adapted to respectively receive the depending ring portions of the following: a large dinner plate, an intermediate sized plate, a small sized plate, soup or salad bowl and a soup cup or the like. It should be noted that the groove 26 is similar in dimension to the groove 14 and adapted to receive the same type of receptacle. With this arrangement the user has an alternative choice where to position the small sized plate on the tray. Similarly the groove 28 is of the same dimension as the groove 16 so that again the user has a choice of positioning the soup or salad bowl either in the groove 28 or the groove 16.

Adjacent the lower left hand edge of the tray as viewed in Figure 1 there is still another group of concentric annular grooves in the upper surface 4 designated respectively according to decreasing diametrical dimension by the numerals 32, 34, 36 and 38. The annular recessed portions are adapted to respectively receive the depending ring portions of the following food receptacles: soup or salad bowl, vegetable dish, coffee cup and soup cup. It should again be noted that the annular groove 32 is similar in dimension to the annular grooves 16 and 28 so that the user has an option of positioning the soup or salad bowl in three positions on the tray 2. Similarly the annular groove 34 is similar in dimension to the annular groove 18 so that the user again has an option of two positions on the tray for the vegetable dish. The annular groove 36 is similar in dimension to the annular groove 20 so that again the user has two alternative positions for the depending ring portion of the coffee cup. It should be noted that the tray upper surface 4 is substantially planar and all of the annular grooves extend below this planar surface. The grooves do not interfere with the use of the tray as a standard conventional tray since the surface remains substantially planar. In fact, my improved tray may be used as a standard tray if the user so elects.

The radial dimension of the grooves is sufficiently large to permit the mating of the depending annular ring portions of the various food receptacles therewith. When the depending ring portions of the food receptacles are positioned in the respective annular grooves, the receptacles will not slide on the tray 2 even when the tray is tilted a substantial angle to the horizontal. Also during abrupt movements of the tray there is no tendency for the receptacles to slide on the upper surface of the tray.

My improved tray results in greater safety in carrying meals from the service center to the dining table and less breakage of dishes, glasses and bowls. As stated, my improved serving tray is flexible so that it can also be used as a conventional standard tray if so desired.

In addition the under side of my tray remains substantially planar so that the trays may be stacked and stored within the same area limits as the conventional standard tray.

According to the provisions of the patent statutes, I have explained the principle, preferred construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A solid food serving tray having a substantially planar upper food receiving surface and a substantially planar lower surface, said tray having an upturned peripheral edge portion and a substantially rectangular shape, said tray upper surface having a plurality of annular grooves therein adapted to receive the depending annular portions of food receptacles so that said food receptacles are restrained from sliding on said tray upper surface, certain of said annular grooves having different diametrical dimensions to receive the depending annular portions of different sized food receptacles and certain of said annular grooves having the same diametrical dimension to receive the depending annular portions of the same sized food receptacles, said annular grooves being arranged on the upper surface of said tray in a plurality of spaced concentric groups, said groups having an outer groove of different diametrical dimension, said groups having annular grooves unequally spaced from each other, said groups including said same sized annular grooves so that said tray upper surface is adapted to receive the same sized food receptacle in different relative positions thereon, and all of said recessed portions extending substantially the same distance below said tray upper surface.

2. A solid food serving tray having a substantially planar upper food receiving surface and a substantially planar lower surface, said tray having an upturned peripheral edge portion and a substantially rectangular shape, said tray upper surface having a plurality of annular grooves therein adapted to receive the depending annular portions of food receptacles so that said food receptacles are restrained from sliding on said tray upper surface, certain of said annular grooves having different diametrical dimensions to receive the depending annular portions of different sized food receptacles and certain of said annular grooves having the same diametrical dimension to receive the depending annular portions of the same sized food receptacles, said annular grooves being arranged on the upper surface of said tray in a plurality of spaced concentric groups, said groups having an outer groove of different diametrical dimension, said groups having annular grooves unequally spaced from each other, said groups including said same sized annular grooves so that said tray upper surface is adapted to receive the same sized food receptacle in different relative positions thereon, said tray upper surface having a plurality of spaced circular depressions therein adapted to receive the circular bottom portions of drinking glasses therein so that said glasses are restrained from sliding on said tray upper surface, and all of said recessed portions extending substantially the same distance below said tray upper surface.

References Cited in the file of this patent

UNITED STATES PATENTS

| | | |
|---|---|---|
| D. 145,764 | Zelov | Oct. 15, 1946 |
| 111,684 | Russ | Feb. 7, 1871 |
| 212,208 | Franz | Feb. 11, 1879 |
| 229,467 | Remhof | June 29, 1880 |
| 424,028 | Sautter | Mar. 25, 1890 |
| 1,885,483 | Samuelson | Nov. 1, 1932 |